United States Patent [19]
Miyaji et al.

[11] Patent Number: 6,140,001
[45] Date of Patent: Oct. 31, 2000

[54] IRON OXIDE MICROPARTICLES AND A PROCESS FOR PRODUCING THEM

[75] Inventors: Makoto Miyaji, Blacksburg; Carmine DiNitto, Draper, both of Va.

[73] Assignee: Mitsui Mining & Smelting Co., Ltd., Tokyo, Japan

[21] Appl. No.: 09/304,642

[22] Filed: May 4, 1999

[51] Int. Cl.⁷ .......................... G03G 9/083; C01G 49/06
[52] U.S. Cl. .................................. 430/106.6; 252/62.52; 252/62.56
[58] Field of Search ...................... 430/106.6; 252/62.56, 252/62.51, 62.52

[56] References Cited

U.S. PATENT DOCUMENTS

| | | | |
|---|---|---|---|
| 3,652,334 | 3/1972 | Abeck et al. | 117/236 |
| 4,272,596 | 6/1981 | Harbour et al. | 427/14 |
| 4,827,945 | 5/1989 | Groman et al. | 128/653 |
| 5,219,554 | 6/1993 | Groman et al. | 424/9 |
| 5,734,020 | 3/1998 | Wong | 530/350 |
| 5,840,457 | 11/1998 | Urawa et al. | 430/45 |
| 5,858,532 | 1/1999 | Kozawa et al. | 428/402 |
| 5,858,595 | 1/1999 | Ziolo | 430/106.6 |
| 5,866,148 | 2/1999 | Hansenne et al. | 424/401 |
| 5,866,158 | 2/1999 | Ribier et al. | 424/450 |
| 5,874,019 | 2/1999 | Uchida et al. | 252/62.59 |
| 5,874,164 | 2/1999 | Caldwell | 428/306.6 |
| 5,876,743 | 3/1999 | Ibsen et al. | 424/426 |
| 5,879,580 | 3/1999 | Tsuda et al. | 252/62.52 |
| 5,879,668 | 3/1999 | Hanna et al. | 424/70.7 |
| 5,882,657 | 3/1999 | Miguel-Colombel et al. | 424/401 |
| 5,882,683 | 3/1999 | Ami | 424/489 |
| 5,885,740 | 3/1999 | Tolcunaga et al. | 252/62.56 |
| 5,888,251 | 3/1999 | Fogg et al. | 8/405 |
| 5,958,282 | 9/1999 | Raj et al. | 252/62.56 |

FOREIGN PATENT DOCUMENTS

| | | |
|---|---|---|
| 0832848 | 4/1998 | European Pat. Off. . |
| 8-169717 | 7/1996 | Japan . |

*Primary Examiner*—John Goodrow
*Attorney, Agent, or Firm*—Birch, Stewart, Kolasch & Birch, LLP

[57] ABSTRACT

The invention resides in iron oxide particles having very small particle size, high saturation magnetization and low remanent magnetization. The invention also resides in a process for producing such particles and compositions containing the particles.

27 Claims, 3 Drawing Sheets

IRON OXIDE MICROPARTICLES AND A PROCESS FOR PRODUCING THEM

FIELD OF THE INVENTION

This invention relates to iron oxide particles of very small size which are low in coercivity and remanent magnetization, high in saturation magnetization, and that are suitable for use in electrophotographic toners and carriers, pigments, or ferrofluids. The invention further relates to a process for producing such iron oxide particles.

BACKGROUND OF THE INVENTION

Various types of electrostatic copying systems are in use today, including laser-beam printers which can produce copies of documents through the use of a computer. Dry development is performed in these systems by either a single component process using only a toner, or dual component system using a toner and a carrier. Iron oxides are frequently used in both toners and carriers.

Magnetic particles for use as toners and carriers are required to have certain characteristics. Particularly in single component toners they are required to have a sufficiently high magnetic saturation so as to form a good magnetic brush in the machine, while having low remanent magnetization and coercivity to avoid magnetic agglomeration of the particles. In fine particle toners, the iron oxide is required to also have a small particle size so as to evenly distribute the magnetic particles through the toner particles. However, coercivity and remanent magnetization usually increase as the diameter of the particle is decreased, as long as the superparamagnetic limit is not exceeded, so the preparation of a very small particles of low coercivity and low remanent magnetization represent conflicting desirable properties of magnetic materials.

Phosphorus compounds are used extensively in the art of magnetic iron oxide production, but have rarely been used in spherical or polyhedral iron oxides. In the preparation of acicular iron oxides, phosphorus is sometimes used in the alpha-FeOOH stage to improve particle size distribution (Japanese Patent Public Disclosure No. 25202/1983 and Japanese Patent Publication No. 18766/1993) and has been used to retard crystal growth in FeOOH (Japanese Patent Publication 25546/1964). U.S. Pat. No. 3,652,334 teaches the use of phosphorus as an antisintering agent in the thermal conversion of FeOOH to $Fe_2O_3$ and/or $Fe_3O_4$. However, all of these examples are directed toward ensuring that the iron oxide particles produced will have improved dispersability or improved shape anisotropy by virtue of retaining their acicularity. European Patent 832,848 describes the use of phosphorus and aluminum together to reduce the magnetic remanence of polyhedral magnetites, but does not in this instance describe the reduction in particle size to produce a very high specific surface area product. Japanese Patent Public Disclosure No. 169717/1996 teaches the use of phosphorus to produce a low remanence magnetite with good polymer dispersability, but does not mention reduction of particle size. Japanese Patent Publication No. 46526/1985 teaches the use of phosphorus in the formation of magnetite particles, but this method is used to produce cobalt containing magnetites of high coercivity and remanence by adding P and Co together.

SUMMARY OF THE INVENTION

The present invention resides in magnetic iron oxide particles of very small size, yet having very low coercivity and remanent magnetization. This is achieved by incorporating 0.5–3.0 wt % (based on total amount of Fe) into solutions from which the particles are formed. The proportion of P in the resulting particles is from 0.5–3.0 wt %, based upon the total Fe in the particle.

These particles have an average diameter of at most about 60 nm, providing a specific surface area (SSA, measured by the BET method) of at least about 30 $m^2/g$. The particles have a coercivity, as measured by a vibrating sample magnetometer (VSM) with an applied field of 9.5 kGauss, of not greater than 40 Oe and preferably not greater than 20 Oe, with a remanent magnetization ($\sigma_r$) measured under the same conditions of 4 emu/g or lower, preferably 1.5 emu/g or lower and a saturation magnetization ($\sigma_m$) of at least 50 emu/g, preferably at least 70 emu/g.

A second aspect of this invention is a process of producing magnetic iron oxide particles by reacting an aqueous ferrous salt solution with and alkali hydroxide to form ferrous hydroxide and subsequently heating it under vigorous agitation with a stream of an oxygen-containing gas, wherein a water-soluble phosphorus-containing compound in the amount of 0.5–3.0 wt % P, as a percentage of total Fe, is added to the ferrous salt, or the alkali hydroxide. Optionally, additional phosphate surface treatment of the particles can be performed.

The resulting phosphorus containing particles are much smaller in size than those produced in the absence of phosphorus, yet have a low coercivity and low remanent magnetization while retaining good saturation magnetization.

DETAILED DESCRIPTION OF THE INVENTION

Figure 1:
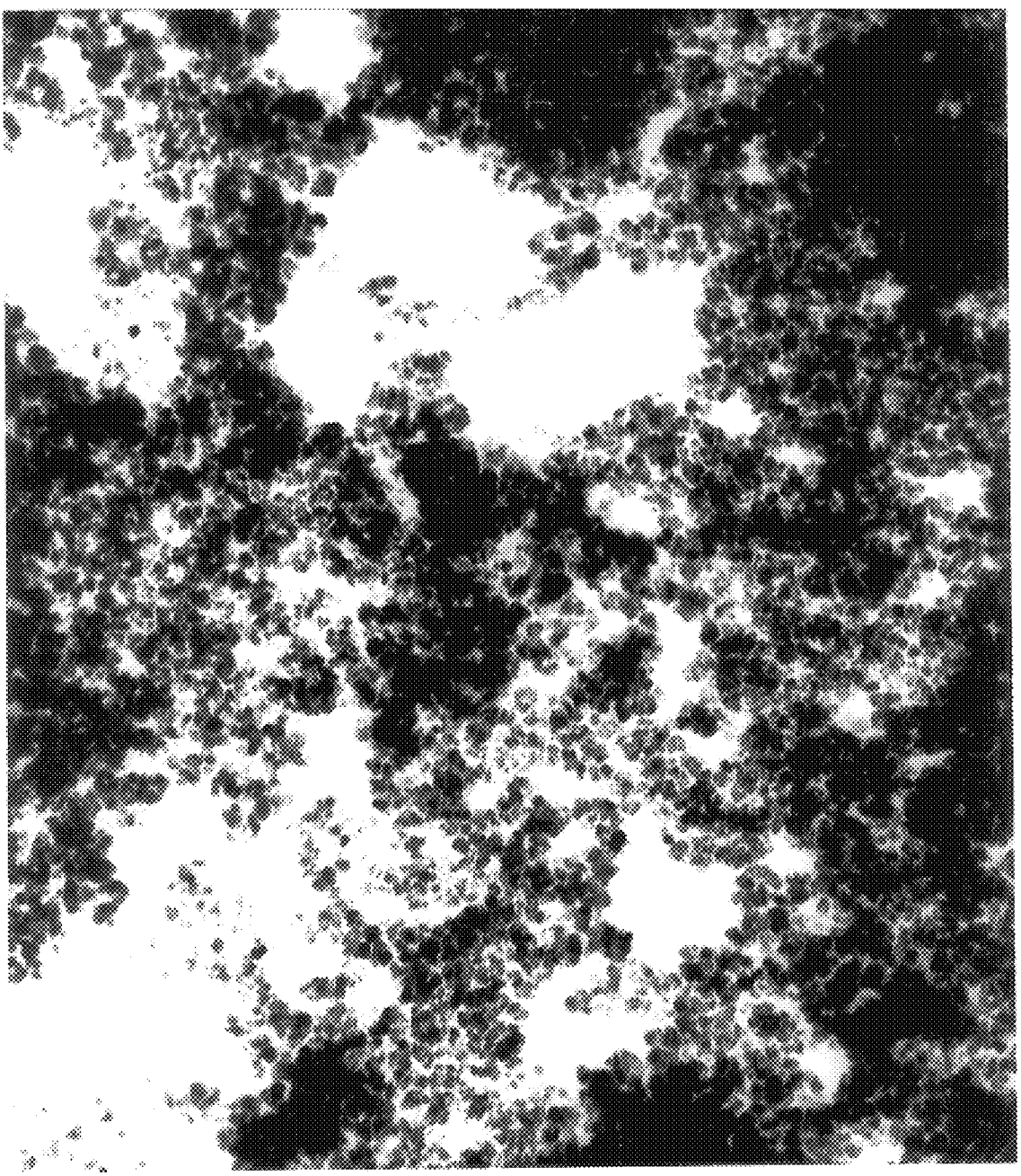
FIG. 1 is a trans electron micrograph of the inventive particles of Example 2 at 154K magnification.

The iron oxide particles of the invention contain between 0.5–3.0 wt % phosphorus, based on iron content in the particles. A preferred amount of phosphorus is from 0.5 to 2.0 wt %, with a more preferred amount being from 1.0 wt % to 2.0 wt %. Exemplary iron oxides in the particles include $Fe_2O_3$, $Fe_3O_4$ and $(Fe_2O_3)_1 \cdot (FeO)_{1-x}$. The proportion of each iron oxide is not limiting of the invention. The iron oxide particles of the invention are preferably substantially free of aluminum. By "substantially free" is meant that the particles contain only a minimal amount aluminum, such that the amount of aluminum does not affect the desired particle size (measured as SSA) or remanent magnetization. Most preferably, aluminum is present at levels consistent with impurities, if at all. It is preferred that the particles of the invention are also substantially free of cobalt, silicon and boron. The iron oxide particles of the invention are most preferably substantially free of all four of cobalt, aluminum, silicon and boron.

The shape of the particles of the invention is not particularly limiting. The particles tend to be spheroidal, but addition of aluminum will tend to make the particles polyhedral.

An advantage of the invention is that very small particles, having a diameter less than 60 nm, providing a specific surface area of at least 29 m²/g, are formed. Yet these very small particles have a low remanent magnetization of 4 emu/g or less as measured by a vibrating sample magnetometer at an applied field of 9.5 kGauss. Preferably, the particles of the invention have a remanent magnetization of 3 emu/g or less, most preferably less than 1.5 emu/g. The preferred range for remanent magnetization is from 1.0 to 4.0 emu/g, more preferably from 1.0 to 2.0 emu/g, most preferably from 1.0 to 1.5 emu/g.

A preferred range of average particle diameter is from 5 nm to 60 nm. A preferred range of SSA is from 30 to 150 m²/g. The more preferred particles of the invention have an average diameter of 5 to 40 nm; most preferred particles are those with an average diameter of 5 to 25 nm. Preferred embodiments are particles with a specific surface area of at least 60 m²/g, most preferably at least 80 m²/g. A preferred range of SSA is from 60 to 150 m²/g, more preferably from 80 to 150 m²/g. Particles of the invention can have SSA of from 60 to about 85 m²/g. Preferred particles of the invention have the property of both a high SSA and low remanent magnetization. Thus, preferred particles of the invention have a SSA of 30 to 150 m²/g and a remanent magnetization of 3.5 emu/g or lower. Expressed as a ratio, the remanent magnetization to specific surface area ratio of the particles of the invention is preferably from about 0.05 to about 0.01.

The coercivity of the iron oxide particles of the invention is 40 Oe or less as measured by a vibrating sample magnetometer at an applied field of 9.5 kGauss. Preferably, the coercivity is 20 Oe or less. The preferred range for coercivity is from 10 Oe to 40 Oe, more preferably from 10 to 30 Oe, most preferably from 10 to 20 Oe.

The oil absorption of the particles of the invention is at least 0.18 ml/g of particles. Preferred particles of the invention have oil absorption capacity of at least 0.3 m/g. Most preferred particles of the invention have oil absorption capacity of at least 0.4 ml/g. Particles of the invention will preferably have an oil absorption capacity of from 0.18 ml/g to 0.45 ml/g, more preferably from 0.25 ml/g to 0.45 ml/g, most preferably from 0.35 ml/g to 0.45 ml/g.

The process for producing iron oxide particles of the invention comprises first mixing a solution of a soluble phosphate compound with a solution of ferrous ion. The ferrous ion is preferably provided as the sulfate salt. The phosphate is preferably sodium orthophosphate ($Na_3PO_4$), sodium tripolyphosphate or sodium polymetaphosphate. The solutions are preferably mixed at a temperature of from 35 to 45° C., preferably from 37 to 42° C., most preferably about 40° C. The solution should contain phosphorous and iron in an amount of from 0.5 to 3.0 wt % of phosphorous based on the amount of iron, preferably the solution contains 0.7 to 3.0 wt % phosphorous, more preferably 1.0 to 2.5 wt % phosphorous.

A solution of hydroxide of an alkali metal or of an alkaline earth metal is then added to provide 0.6 to 1.0 equivalents of hydroxide to ferrous ion. Preferably from 0.6 to 0.9 equivalents, more preferably 0.7 to 0.8 equivalents of hydroxide to ferrous ion are added. The alkali metal is preferably sodium or potassium, most preferably sodium.

The solution is then heated to a temperature of between 75 to 95° C., preferably 85 to 90° C., and an oxidation step is performed by passing an oxygen-containing gas through the heated solution until a ratio of $Fe^{+3}$ to $Fe^{+2}$ of about 2 to 1 is achieved. The final ratio of $Fe^{+3}$ to $Fe^{+2}$ can vary by about 10%, that is from 1.8 to 2.2 to 1. It is more preferred that the ratio be from 1.9 to 2.1 to 1. The oxygen-containing gas is preferably merely oxygen, but air can be used. The solution is preferably vigorously agitated during the oxidation step, short of producing a highly turbulent or cavitating condition. If air is used rather than oxygen, the flow rate must be raised to provide sufficient oxygen to oxidize sufficient ferrous ion to ferric ion at a useful rate. The oxidation is preferably performed at a rate such that 5 to 10 g/L of $Fe^{2+}$ is oxidized over a time of 3 to 4 hours. If the oxidation step is carried too far, then the FeO level in the product is reduced, resulting in a brown, low saturation product.

The iron oxide particles of the invention will precipitate from the solution and can be collected by any of the means known in the art, such as settling, centrifugation or filtration. The particles can then be washed and dried by processes known in the art.

The process of the invention can optionally include a second phosphorous addition, which tends to produce a surface high in phosphorous content. In this embodiment of the invention a solution of a second soluble phosphate compound, in an amount of 0.25 to 3.0 wt % phosphorous, based upon the amount of ($Fe^{+3}+Fe^{+2}$) is added after the oxidation step. The amount of phosphorous for the second addition is preferably from 0.7 to 3.0 wt % phosphorous, more preferably 1.0 to 2.5 wt % phosphorous. Then the pH is adjusted to a value from 4 to 6, and the solution is allowed to stand or the iron oxide particles are otherwise collected.

The iron oxide particles of the invention can be used in any of the typical applications for iron oxide powders. For example, the particles can be incorporated into magnetic toner, cosmetic and ferrofluid compositions. Exemplary, but not limiting, magnetic toner compositions are described in U.S. Pat. Nos. 5,874,019, 5,858,595, 5,858,532 and 5,840, 457. Exemplary, but not limiting, cosmetic compositions are described in U.S. Pat. Nos. 5,888,251, 5,882,683, 5,882,657, 5,879,668, 5,866,158 and 5,866,148. Exemplary, but not limiting, ferrofluid compositions are described in U.S. Pat. Nos. 5,879,580, 5,858,595, 5,734,020, 5,219,554, 4,827,945 and 4,272,596. U.S. Pat. No. 5,876,743 describes use of iron oxide particles in a biocompatible adhesive for tissue repair. U.S. Pat. No. 5,874,164 describes use of iron oxide particles in barrier materials having bioactive surfaces.

Articles of the scientific periodical and patent literature cited throughout are hereby incorporated in their entirety by reference by such citation.

The invention is illustrated by the following examples, which serve to exemplify, not limit, the invention. The scope of the invention is limited only by the claims following.

EXAMPLES

Example 1

A 12 liter stainless steel reactor is charged with 5 liters of water. The temperature is raised to 40° C. using a steam coil. To a 1.84 liter solution of 2 molar ferrous sulfate, 9.3 grams of 86% orthophosphoric acid are added and mixed well, and then added to the reactor. While mixing well, but not hard enough to create a vortex, the ferrous sulfate solution is added to the reactor, followed by 310 ml of 50% (19.07 molar) NaOH solution. Additional water is added to bring the volume to 8 liters. The sodium hydroxide level is approximately 0.82 equivalents relative to the ferrous sulfate level. The reactor is then heated to 90° C., and under vigorous agitation, oxygen is bubbled through the reactor at a rate of 75 ml/min. until the ratio of $Fe^{3+}$ to $Fe^{2+}$ of 2 to 1 is attained. When that endpoint is reached, an additional 9.3 grams of orthophosphoric acid is added, the pH is adjusted to 5 and the suspension is digested for 30 minutes. The suspension is cooled to 30° C., washed to remove soluble salts, and dried. The dried material is comminuted as known in the art.

The magnetic properties of the resulting particles are measured by VSM using an applied field of 9.5 kGauss. It is expected that the results are robust, varying by less than 10% when lower field strengths of 1 to 5 kGauss are used to perform similar measurements. BET measurements are performed using a Quantachrome Monosorb™ single-point BET unit at an altitude of 1,950 above sea level. Thus, SSA data reported in Table 1 should be lowered approximately 7% to compare to measurements obtained at sea level.

Oil absorption, as measured by an absorptometer "E" (Brabender) was 0.42 mls/g.

Example 2

The procedure in Example 1 is followed except that no additional phosphorus compound is added after oxidation. The resulting inventive particles are shown in FIG. 1. FIG. 1 is a trans electron micrograph of these particles at 154K magnification.

Example 3

The procedure in Example 1 is followed except that first addition of phosphorus compound is in the amount of 5.6 grams rather than 9.3, and second addition after oxidation is omitted.

Example 4

Figure 2:
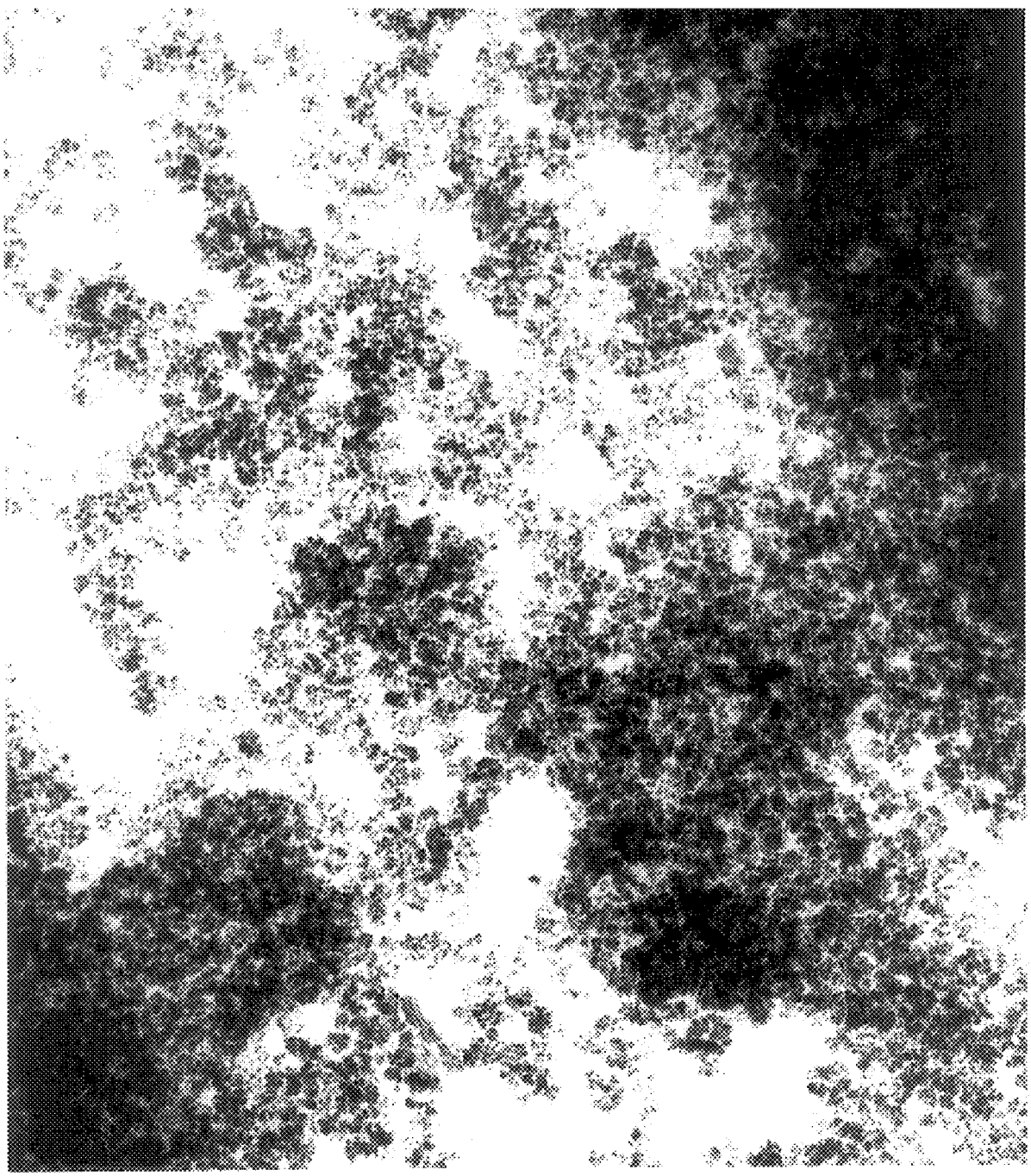
FIG. 2 is a trans electron micrograph of the inventive particles of Example 4 at 154K magnification.

The procedure in Example 1 is followed except that first addition of phosphorus compound is in the amount of 22.3 grams rather than 9.3, and second addition after oxidation is omitted. The resulting inventive particles are shown in FIG. 2. FIG. 2 is a trans electron micrograph of these particles at 154K magnification.

Comparative Example 1

The procedure in Example 1 is followed except that second addition of phosphorus compound is in the amount of 1.86 grams rather than 9.3 grams, and the first addition before oxidation is omitted.

Comparative Example 2

The procedure in Example 1 is followed except that no phosphorus compound is added either before or after oxidation.

Comparative Example 3

Figure 3:
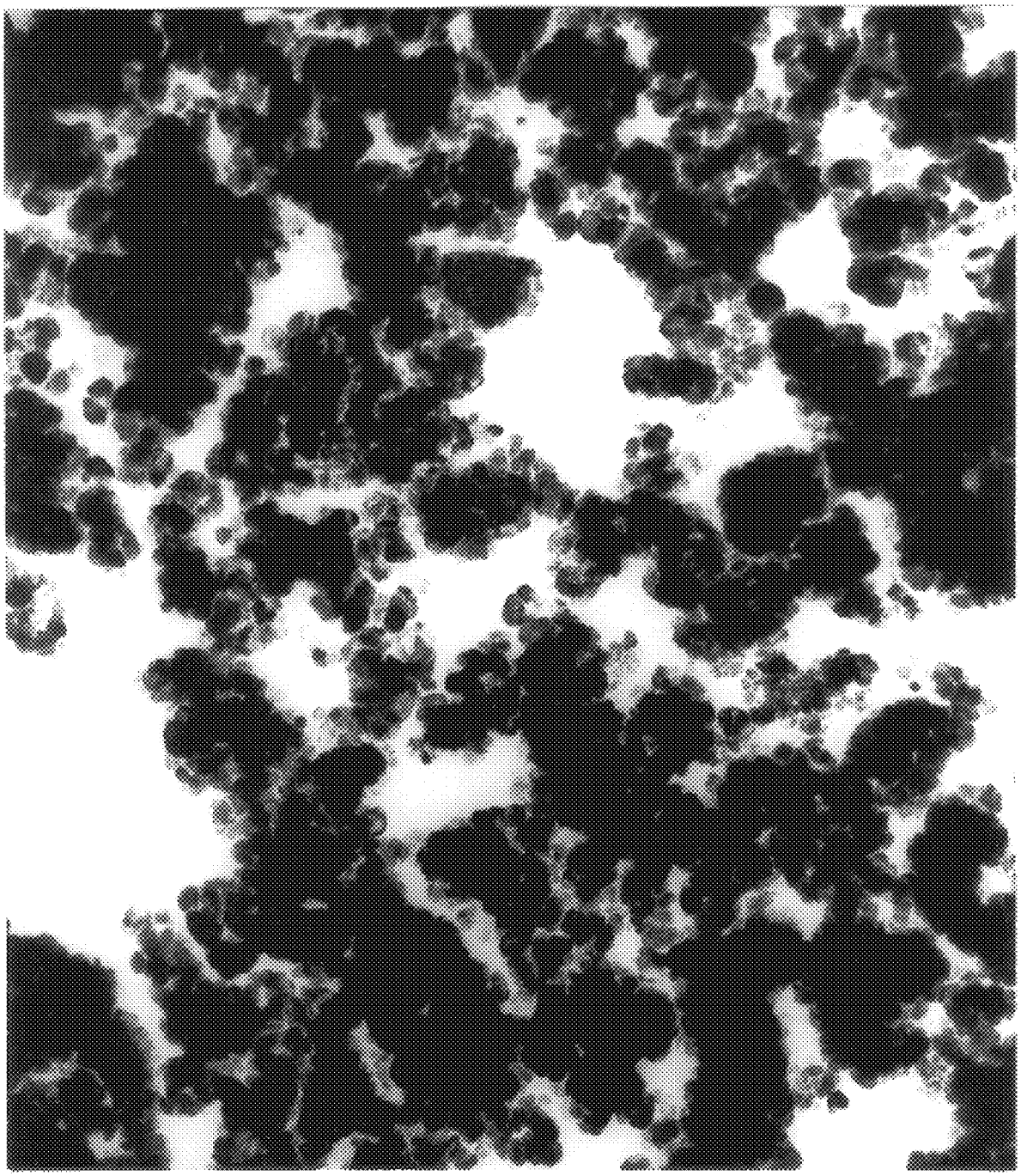
FIG. 3 is a trans electron micrograph of the comparative particles of Comparative Example 3 at 154K magnification.

The procedure in Example 1 is followed except that first addition of phosphorus compound is in the amount of 1.86 grams rather than 9.3 grams, and the second addition after oxidation is omitted. The resulting comparative particles are shown in FIG. 3. FIG. 3 is a trans electron micrograph at 154K magnification.

What is claimed is:

1. A composition comprising iron oxide particles comprising 0.5 to 3.0 wt % phosphorous, having an average particle diameter of from 5 to 60 nm and a saturation magnetization of at least 50 emu/g as measured by a vibrating sample magnetometer at an applied field of 9.5 kGauss and having a specific surface area of at least 30 m$^2$/g.

2. The composition of claim 1, wherein the iron oxide particles have a remanent magnetization of 4 emu/g or less as measured by a vibrating sample magnetometer at an applied field of 9.5 kGauss.

3. The composition of claim 1, having an oil absorption capacity of 0.18 ml/g or greater.

4. The composition of claim 3, wherein said iron oxide particles have a remanent magnetization of 4.0 emu/g or less as measured by a vibrating sample magnetometer at an applied field of 9.5 kGauss.

5. The composition of claim 1, wherein said iron oxide particles have a remanent magnetization ranging from 0.1 emu/g to 4 emu/g.

6. The composition of claim 1, wherein said iron oxide particles have a coercivity of 40 Oe or less as measured by a vibrating sample magnetometer at an applied field of 9.5 kGauss.

7. The composition of claim 1, wherein said iron oxide particles have a coercivity of 20 Oe or less as measured by a vibrating sample magnetometer at an applied field of 9.5 kGauss.

8. The composition of claim 1, wherein said iron oxide particles are substantially free of cobalt, aluminum, silicon and boron.

9. A process for producing iron oxide particles comprising:
   a) mixing a solution of a soluble phosphate compound with a solution of ferrous ion at a temperature of from 35 to 45° C., to obtain a ratio of 0.5 to 3.0 wt % of phosphorous, based upon the amount of iron;
   b) adding a solution of hydroxide of an alkali metal or of an alkaline earth metal to provide 0.6 to 1.0 equivalents of hydroxide to ferrous ion;
   c) heating the solution obtained in b) to 75 to 95° C.;
   d) bubbling an oxygen-containing gas through the heated solution until a ratio of $Fe^{+3}$ to $Fe^{+2}$ of 1.8 to 1 to 2.2 to 1 is achieved; and
   e) collecting the resulting iron oxide particles.

10. The process according to claim 9, further comprising prior to step e):
   d1) adding a solution of a second soluble phosphate compound, in an amount of 0.25 to 3.0 wt % phosphorous, based on the amount of ($Fe^{+3}$+$Fe^{+2}$);

TABLE 1

| Example No. | P/Fe wt % (measured) | P/Fe wt % (added) | SSA by BET | Coercivity Oe | $\sigma_r$ emu/g | $\sigma_m$ emu/g | Avg. particle diameter (nm) |
|---|---|---|---|---|---|---|---|
| Ex. 1 | 2.26% | 2.34%[1] | 78.9 | 10.2 | 1.1 | 71.7 | 22 |
| Ex. 2 | 1.17% | 1.17% | 85.9 | 11 | 1.3 | 71.5 | 20 |
| Ex. 3 | 0.81% | 0.70% | 63.3 | 35.1 | 3.5 | 75.9 | 10 |
| Ex. 4 | 2.26% | 2.80% | 136 | 1.5 | 0.1 | 53 | 7 |
| Comp. Ex. 1 | 0.23% | 0.23% | 11 | 70.9 | 5.6 | 81.9 | 160 |
| Comp. Ex. 2 | 0.00% | 0.00% | 10.3 | 83 | 6.4 | 81.6 | 150 |
| Comp. Ex. 3 | 0.23% | 0.23% | 28.9 | 6.5 | 6.5 | 80.6 | 40 |

[1]1.17% was added prior to oxidation and an additional 1.17% was added after oxidation.

d2) adjusting the pH to a value from 4 to 6, and allowing the solution to stand or otherwise collecting the iron oxide particles.

11. The process of claim 9, wherein said phosphate compound is orthophosphoric acid.

12. The process of claim 10, wherein said phosphate compound and said second phosphate compound are orthophosphoric acid.

13. The process of claim 9, wherein said hydroxide is a hydroxide of an alkali metal.

14. An iron oxide particle made by the process of claim 9.

15. An iron oxide particle made by the process of claim 10.

16. A toner composition comprising the iron oxide composition of claim 1 and a carrier.

17. A cosmetic composition comprising the iron oxide composition of claim 1 and a cosmetically suitable carrier.

18. A ferrofluid comprising a suspension of the iron oxide composition of claim 1 in a liquid carrier.

19. An iron oxide particle comprising from 0.5% to 3.0 wt % phosphorus, based on the total amount of iron contained in the particle, having an average particle diameter of from 5 to 60 nm and a saturation magnetization of at least 50 emu/g as measured by a vibrating sample magnetometer at an applied field of 9.5 kGauss and having a specific surface area of at least 30 $m^2/g$.

20. A process for producing iron oxide particles comprising:
   a) mixing a solution of a soluble phosphate compound with a solution of ferrous ion at a temperature of from 35 to 45° C., to obtain a ratio of 0.5 to 3.0 wt % of phosphorous based on the amount of iron;
   b) adding a solution of hydroxide of an alkali metal or of an alkaline earth metal to provide 0.6 to 1.0 equivalents of hydroxide to ferrous ion;
   c) heating the solution obtained in b) to 75 to 95° C.;
   d) bubbling an oxygen-containing gas through the heated solution until a ratio of $Fe^{+3}$ to $Fe^{+2}$ of 1.8 to 1 to 2.2 to 1 is achieved; and
   e) collecting the resulting iron oxide particles of claim 19.

21. The process according to claim 20, wherein the ratio of $Fe^{+3}$ to $Fe^{+2}$ in step d) is 2 to 1.

22. The composition of claim 1, wherein said particles are spherical.

23. A composition comprising spherical iron oxide particles comprising 0.5 to 3.0 wt % phosphorous, having an average particle diameter of from 5 to 60 nm and a saturation magnetization of at least 50 emu/g as measured by a vibrating sample magnetometer at an applied field of 9.5 kGauss.

24. The process of claim 9, wherein in step b) the solution of hydroxide of alkali metal or of hydroxide of alkaline earth metal is added to provide 0.6 to 0.9 equivalents of hydroxide to ferrous ion.

25. The process of claim 9, wherein in step b) the solution of hydroxide of alkali metal or of hydroxide of alkaline earth metal is added to provide 0.7 to 0.8 equivalents of hydroxide to ferrous ion.

26. The composition of claim 1, wherein said particles comprise 1.0 to 2.0 wt % phosphorous.

27. The particles of claim 19 that comprise 1.0 to 2.0 wt % phosphorous.

* * * * *